(12) United States Patent  (10) Patent No.: US 8,610,907 B2
You  (45) Date of Patent: Dec. 17, 2013

(54) IMAGE FORMING APPARATUS AND METHOD OF CONTROLLING THE SAME

(75) Inventor: Ho Gun You, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 651 days.

(21) Appl. No.: 12/054,686

(22) Filed: Mar. 25, 2008

(65) Prior Publication Data

US 2009/0027709 A1  Jan. 29, 2009

(30) Foreign Application Priority Data

Jul. 24, 2007 (KR) ........................ 10-2007-0074162

(51) Int. Cl.
*G06F 3/12* (2006.01)
(52) U.S. Cl.
USPC ........ 358/1.13; 358/1.15; 358/1.18; 358/474; 399/81; 399/82; 399/363; 399/374
(58) Field of Classification Search
USPC ............... 358/1.15, 474, 505, 1.13, 1.4, 1.12, 358/1.16, 1.17, 1.18, 501, 401, 408, 448; 399/45, 407, 408, 2, 46, 81, 82, 85, 399/362, 363, 364, 365, 368, 371, 374, 381
See application file for complete search history.

(56) References Cited

U.S. PATENT DOCUMENTS

| | | | |
|---|---|---|---|
| 6,356,719 B1 * | 3/2002 | Yoshiura | 399/45 |
| 7,209,260 B1 * | 4/2007 | Tanaka et al. | 358/1.2 |
| 7,268,909 B2 * | 9/2007 | Nakagiri | 358/1.16 |
| 7,497,424 B2 * | 3/2009 | Nakajima et al. | 270/12 |
| 7,782,497 B2 * | 8/2010 | Kimoto et al. | 358/448 |
| 2007/0268528 A1 * | 11/2007 | Ikeno et al. | 358/474 |

FOREIGN PATENT DOCUMENTS

| | | |
|---|---|---|
| CN | 2590072 | 12/2003 |
| CN | 1975607 | 6/2007 |
| JP | 3-283974 | 12/1991 |
| JP | 11-275304 | 10/1999 |
| JP | 2005-142770 | 6/2005 |
| JP | 2005-217573 | 8/2005 |
| JP | 2006-094426 | 4/2006 |

OTHER PUBLICATIONS

Chinese Office Action issued Jan. 29, 2010 in CN Application No. 200810092184.3.
Japanese Office Action dated Jul. 3, 2012 issued in JP Application No. 2008-112879.
Korean Office Action dated May 10, 2013 issued in KR Application No. 10-2007-0074162.

* cited by examiner

*Primary Examiner* — Vu B Hang
(74) *Attorney, Agent, or Firm* — Stanzione & Kim, LLP

(57) ABSTRACT

A front-side image and a back-side image of a document are read using a plurality of image sensors mounted on a transfer path and are displayed on a display unit implemented by a touch screen, and a subsequent process of an image to be processed according to a selection of a user is performed. Accordingly, a user convenience in view of an operation to process a read image is improved.

9 Claims, 8 Drawing Sheets

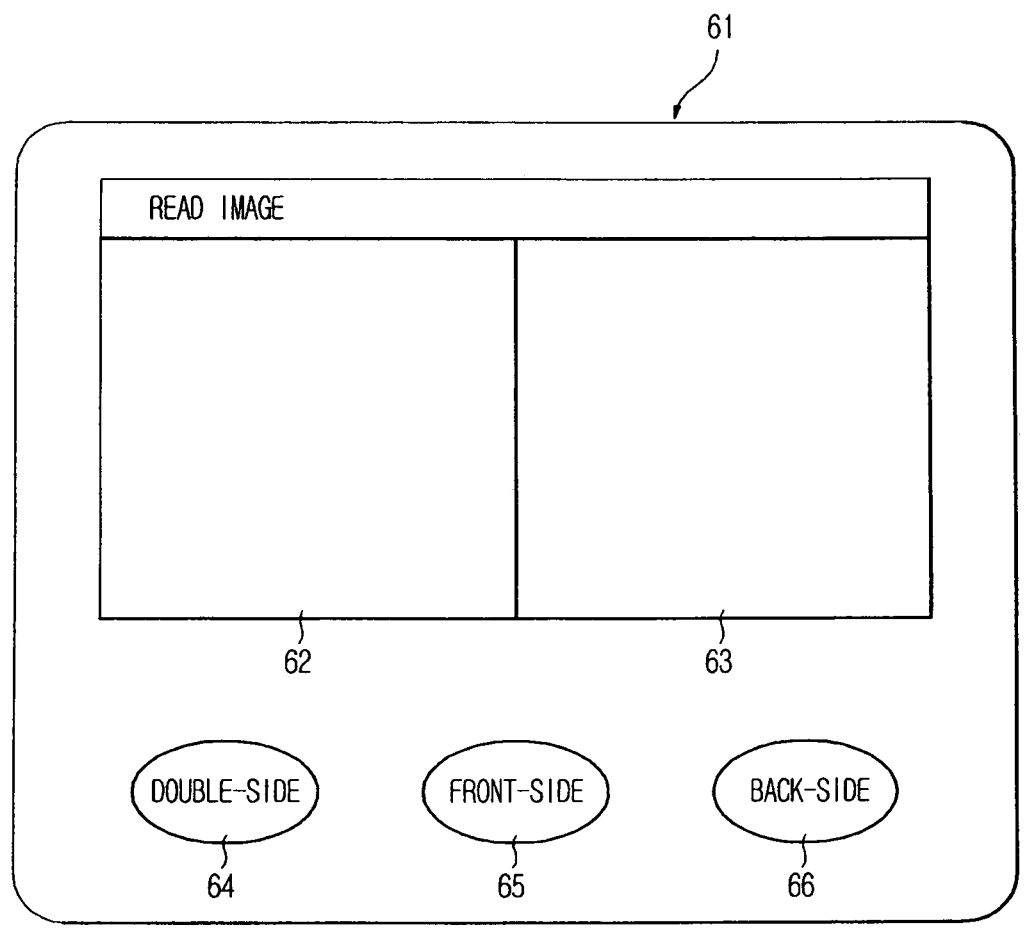

IMAGE FORMING APPARATUS AND METHOD OF CONTROLLING THE SAME

CROSS-REFERENCE TO RELATED APPLICATIONS

This application claims priority under 35 U.S.C. §119(a) from Korean Patent Application No. 2007-74162, filed on Jul. 24, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus including a function to read double-side images of a document using a sensor mounted on a document transfer path, and a method of controlling the same.

2. Description of the Related Art

Generally, an image forming apparatus such as a copier, a printer or a facsimile machine includes a reading function to read data recorded on a document.

A reading device using a flat-bed reading method includes a flat bed on which a document is laid and a charge coupled device (CCD) disposed below the flat bed to read one side of the document.

A method of reading both sides of a document includes a method of reading an image on one side of a document and reading an image on an other side of the document using a single image sensor while changing a transfer direction of the document and a method of reading images on front and back sides of a document transferred along a document transfer path using a plurality of image sensors provided on the document transfer path so as to face each other.

In an image forming apparatus including a double-side read function, a user confirms a document loaded on a document loading table, selects which of a front side, a back side or both sides of the document is read, and performs a reading operation. Accordingly, if an amount of documents is large and the documents are not sorted, a user determines which of a front-side read mode, a back-side read mode or a double-side read mode is set with respect to the respective documents, thereby leading to inconvenience to a user. In consideration of this problem, a method of sorting the documents according to the read mode and reading the documents may be employed. However, since an operation to sort the document according to the read mode is required, this method is also inconvenient.

SUMMARY OF THE INVENTION

The general inventive concept provides an image forming apparatus capable of simplifying an operation to read and process an image of a document so as to improve convenience for a user and a method of controlling the same.

Additional aspects and/or utilities of the general inventive concept will be set forth in part in the description which follows and, in part, will be obvious from the description, or may be learned by practice of the general inventive concept.

The foregoing and/or other aspects and utilities of the general inventive concept may be achieved by providing an image forming apparatus including a document transfer path along which a document is transferred, an image reading unit mounted on the document transfer path, a display unit to display an image read by the image reading unit and to receive an input command of a user, and a control unit to transfer the document to the image reading unit, to display the image read by the image reading unit on the display unit, and to control an image processing operation with respect to a read image according to a selection of a user through the display unit.

The image reading unit may read double-side images of the document using at least one image sensor mounted on the document transfer path.

If the image reading unit includes a plurality of image sensors, the plurality of image sensors may be provided to be separated from each other by a predetermined distance.

The display unit may include a touch screen to display a read image.

A display region to display a plurality of document images and a selection key to select an image to be processed from the plurality of document images may be displayed on the touch screen.

The image processing operation of the control unit may perform at least one of operations to store, transmit and copy the selected read image.

The foregoing and/or other aspects and utilities of the general inventive concept may also be achieved by providing a method of controlling an image forming apparatus including an image reading unit to read images of a document, the method including loading the document on a document load table, reading the images of the document transferred along a document transfer path using the image reading unit, displaying the read document images on a screen, and performing an image processing operation with respect to a document image selected by a user between the document images displayed on the screen.

The read document images may be double-side images of the document obtained by at least one image sensor mounted on the document transfer path.

The foregoing and/or other aspects and utilities of the general inventive concept may also be achieved by providing a method of controlling an image forming apparatus including at least one image sensor mounted on a document transfer path, the method including selecting any one of a first read mode to read images of a document using the image sensor and selecting an image to process between the read images and a second read mode to select an image of the document to read and reading the image of the document, and performing at least one of operations to store, transmit and copy the read image to process by the selected read mode as a subsequent process.

The first read mode may include determining whether the document is loaded on a document load table, transferring the document to the at least one image sensor when the document is loaded, reading a front-side image and a back-side image of the document by the at least one image sensor, displaying the front-side image and the back-side image of the document on a screen of a display unit, and selecting at least one of the front-side image and the back-side image using an image selection key of the display unit.

The foregoing and/or other aspects and utilities of the general inventive concept may also be achieved by providing an image forming apparatus including an image reading unit to automatically read images on both sides of a document, a user interface to receive the images read by the image reading unit and to allow a user to select at least one of the images and a control unit to perform a function on the document corresponding to the image selected by the user.

The foregoing and/or other aspects and utilities of the general inventive concept may also be achieved by providing a method of selecting a scan function of an image forming apparatus, the method including automatically reading images on both sides of a document, providing the images read to a user interface to allow a user to select at least one of the images and performing the scan function based on the at least one image selected by the user.

The foregoing and/or other aspects and utilities of the general inventive concept may also be achieved by providing a computer-readable recording medium having embodied thereon a computer program to execute a method, wherein the method comprises automatically reading images on both sides of a document, providing the images read to a user interface to allow a user to select at least one of the images and performing a read function based on the at least one image selected by the user.

BRIEF DESCRIPTION OF THE DRAWINGS

These and/or other aspects and utilities of the general inventive concept will become apparent and more readily appreciated from the following description of the embodiments, taken in conjunction with the accompanying drawings of which:

FIG. 3 is an example illustrating a screen to display a front-side image and a back-side image and allowing a user to select an image when double-side images are read according to an embodiment of the present general inventive concept using a single read mode;

DETAILED DESCRIPTION OF THE PREFERRED EMBODIMENTS

Figure 1:
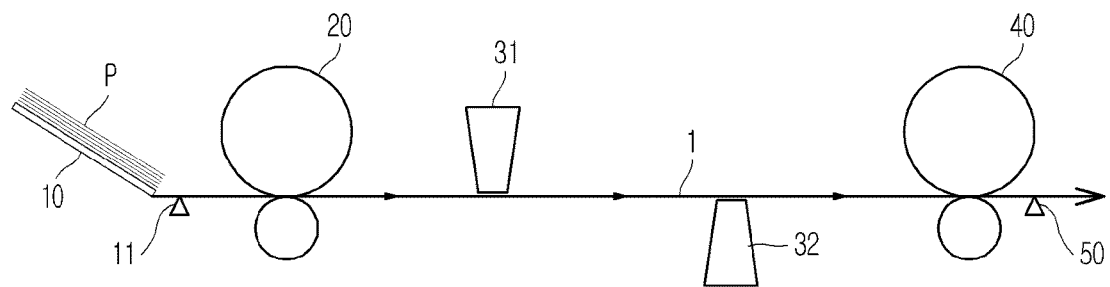
FIG. 1 is a view illustrating an operation to read both sides of a document using an image reading unit included in an image forming apparatus according to the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

Hereinafter, an image forming apparatus and a method of controlling the same according to an embodiment of the present general inventive concept will be described.

As illustrated in FIG. 1, an image reading device included in the image forming apparatus according to an embodiment of the present general inventive concept is mounted on a document transfer path 1 and includes a plurality of image sensors 31 and 32, to achieve a double-side reading function. The image reading device is not limited to including the plurality of image sensors 31 and 32 and may use a method of reading double-side images using a single image sensor 31 or 32.

The image sensor 31 or 32 may be a device to read an image and convert the image into storable data, such as a charge coupled device (CCD) or a contact image sensor (CIS).

Although, in the present embodiment, the plurality of image sensors 31 and 32 are provided on the document transfer path 1 to be separated from each other by a predetermined distance, the present general inventive concept is not limited to this. The plurality of image sensors may face each other with the document transfer path 1 interposed therebetween.

A document P is laid on a document loading table 10 and a document load detecting unit 11 detects whether the document P is loaded thereon.

If the document P is loaded, the document P is transferred to a first transfer roller 20 by a pickup roller (not illustrated). The document P reaching the first transfer roller 20 is transferred along the document transfer path 1 by a rotation of the first transfer roller 20.

The first image sensor 31 reads a front-side image at the upper side of the document P transferred along the document transfer path 1 and the second image sensor 31 reads a back-side image at the lower side of the document P transferred along the document transfer path 1. The image read operations of the first and second image sensors 31 and 32 may be simultaneously performed.

The document P passing through the second image sensor 32 is transferred to a second transfer roller 40 along the transfer path 1 and is ejected to a sheet cassette (not illustrated). The ejection of the document is detected by a document detection sensor 50.

Figure 2:
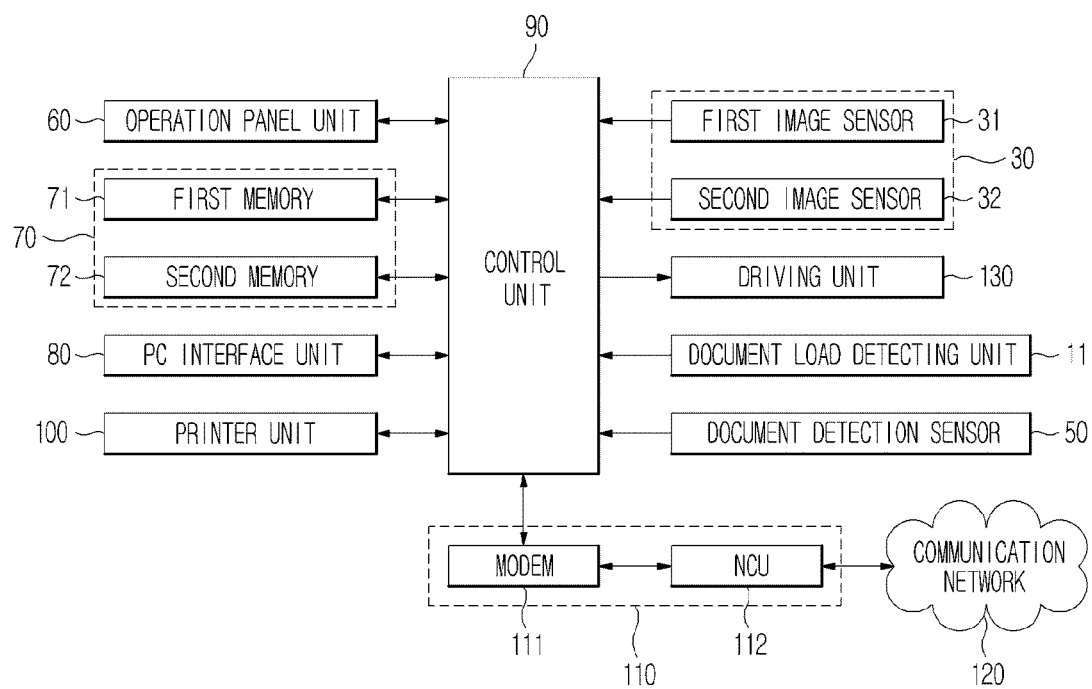
FIG. 2 is a block diagram illustrating the image forming apparatus including the image reading unit according to an embodiment of the present general inventive concept.

The image forming apparatus according to an embodiment of the present general inventive concept includes an image reading unit 30 to read double-side images of the document using the first and second image sensors 31 and 32, as illustrated in FIG. 2.

The image forming apparatus according to the present embodiment includes a PC interface unit 80, a printer unit 100 and a facsimile unit 110, in addition to the image reading unit 30 to read the image of the document.

An operation panel unit 60 may receive an input command by a touch of a user and may be implemented by a touch screen to display predetermined data and a read image. Alternatively, the operation panel unit 60 may be implemented by a liquid crystal display (LCD) which is a display unit to display an entire operation state of the apparatus and a function key to allow the user to input an input command. The operation panel unit may be included in the image forming apparatus or may be a display unit included in a PC or server, a control device (an external device to control the image forming apparatus or an external control device), a broadcasting receiver (a device connected to the image forming apparatus, such as a digital multimedia broadcasting (DMB) device or an air-wave receiver), an image photographing device (a digital camera), or the like, all of which interface to the image forming apparatus.

A memory unit 70 stores a variety of programs necessary to perform an operation of the image forming apparatus and data related thereto and includes a first memory 71 and a second memory 72. The first memory 71 stores a variety of programs necessary to implement a respective function of the image forming apparatus. Generally, the first memory 71 may be a non-volatile memory device such as a ROM. The second memory 72 temporarily stores a variety of data, generated when the operation of the image forming apparatus is performed, and information on the data. Generally, the second memory 72 may be a volatile memory device such as a DRAM.

Similar to the operation panel unit, the memory unit 70 may be included in the image forming apparatus or may be included in an external device which interfaces to the image forming apparatus. For example, the memory unit may be a memory unit 70 included in a PC or server, a control device (an external device to control the image forming apparatus or an external control device), a broadcasting receiver (a device connected to the image forming apparatus, such as a digital multimedia broadcasting (DMB) device or an air-wave receiver), an image photographing device (a digital camera or the like), or an external memory (a USB memory, a SD memory or the like), all of which interface to the image forming apparatus.

The PC interface unit 80 connects the image forming apparatus to an external device and is generally connected to a parallel port of a user's computer. The PC interface unit 80 performs communication with the external device, receives print data from the external device, and transmits print information of the print data to the external device.

The printer unit 100 is operated when a print function is performed and performs an operation to print image data read by the image reading unit 30 under the control of the control unit 90.

The facsimile unit 110 includes a modem 111 and a network control unit (NCU) 112. The modem 111 decodes fax data received from an external device connected to a communication network 120 via the NCU 112. The modem 111 encodes fax data to transmit to the external device to a form which can be transmitted via the communication network 120.

The facsimile unit 110 may be integrally mounted with the image forming apparatus or may be externally connected to the image forming apparatus. For example, the facsimile unit 110 may be a facsimile unit included in a PC or server, a control device (an external device to control the image forming apparatus or an external control device), a broadcasting receiver (a device connected to the image forming apparatus, such as a digital multimedia broadcasting (DMB) device or an air-wave receiver), an image photographing device (a digital camera), or the like, all of which interface to the image forming apparatus.

The NCU 112 is connected between the modem 111 and the communication network 120 so as to transmit/receive fax data. Here, the communication network 120 may be a public switched telephone network (PSTN) or a wired/wireless communication network.

A driving unit 130 includes at least one motor to drive the pickup roller (not illustrated) and the first and second transfer roller 20 and 40, and drives the motor to transfer the document P under the control of the control unit 90.

When power is supplied to the apparatus, the control unit 90 controls the entire operation of the apparatus according to the program stored in the first memory 71.

In a document read operation, an image to be read is not selected by the user. That is, when a document is only loaded on the document loading table 10, the double-side images of the document are automatically read and the read images are displayed such that the user is allowed to select an image to be read through the operation panel unit 60. FIG. 3 illustrates a screen to display the double-side images in this example.

As illustrated in FIG. 3, a screen 61 includes a first display region 62 to display a front-side image read by the first image sensor 31, a second display region 63 to display a back-side image read by the second image sensor 32, and image selection keys 64, 65 and 66 to select any one or both of the first and second display regions 62 and 63.

A subsequent process is performed with respect to the read front-side image and back-side image when the user selects the double-side key 64. A subsequent process is performed with respect to the read front-side image when the user selects the front-side key 65. A subsequent process is performed with respect to the read back-side image when the user selects the back-side key 66. Here, the subsequent process includes an operation to store read image data in the user's computer using the PC interface unit 80, an operation to transmit the read image to the external device using the facsimile unit 110, and an operation to copy the read image on a printing medium using the printer unit 100.

Figure 4A:
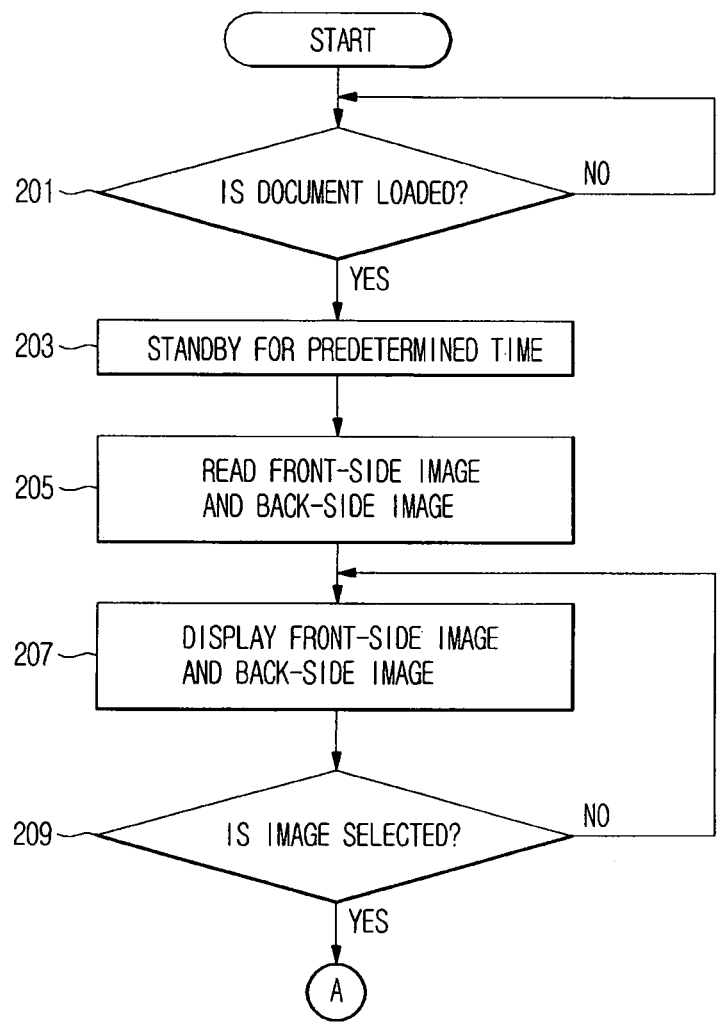
FIGS. 4A and 4B are flowcharts illustrating a method of processing the double-side images by a process corresponding to an input command of the user, according to the embodiment as illustrated in FIG. 1 using the single read mode.
Figure 4B:
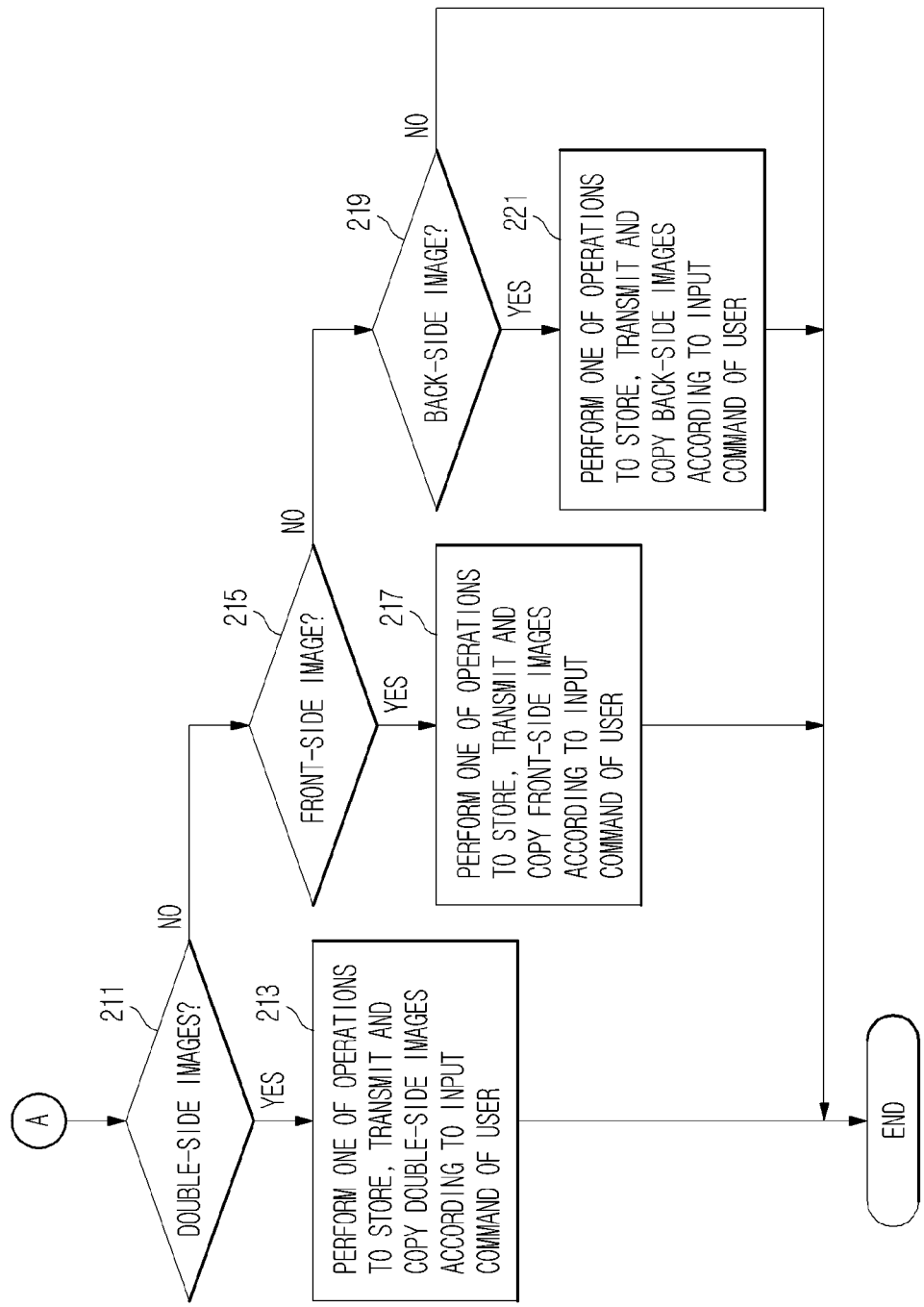

Referring to FIGS. 4A and 4B, the control unit 90 determines whether a document P is loaded on the document loading table 10 using the document load detecting unit 11 (operation 201). If a determination is made that the document is loaded, then the control unit 90 stands by for a predetermined time before picking up the loaded document (operation 203), in order to stably transfer the document. The predetermined time is, for example, 1 to 2 seconds.

Next, the control unit 90 controls the driving unit 130 such that the document P is picked up and transferred along the transfer path 1 by the rotation of the first and second transfer rollers 20 and 40. During transferring, the first image sensor 31 reads the front-side image of the document and the second image sensor 32 reads the back-side image of the document (operation 205). The control unit 90 receives the read image data, temporarily stores the read image data in the second memory 72, and displays the read image data on the operation panel unit 60. At this time, the front-side image and the back-side image of the document are respectively displayed in the first display region 62 and the second display region 63 of the screen 61 illustrated in FIG. 3 (operation 207). The double-side key 64, the front-side key 65 and the back-side key 66 are displayed on the screen 61 such that the user is allowed to select a desired read image.

The control unit 90 determines whether the user selects an image (operation 209). If a determination is made that the user selects the image, then a determination is made whether double-side read images are selected by the double-side key 64 (operation 211). If a determination is made that the double-side read images are selected, then the control unit 90 performs a subsequent process which is one of the operations to store, transmit and copy the double-side images according to an input command set by the user through the screen (not illustrated) (operation 213). The subsequent process includes the operation to store double-side read image data in the user's computer using the PC interface unit 80, an operation to transmit the double-side read image to the external device using the facsimile unit 110, and an operation to copy the double-side read image on a printing medium using the printer unit 100.

If a determination is made that the double-side read image is not selected in Operation 211, then the control unit 90 determines whether the front-side image is selected by the front-side key 65 (operation 215). If a determination is made that the front-side image is selected, then the control unit 90 performs the subsequent process which is one of the operations to store, transmit and copy the front-side image according to an input command set by the user (operation 217).

If a determination is made that the front-side image is not selected in Operation 215, then the control unit 90 determines whether the back-side image is selected by the back-side key 66 (operation 219). If a determination is made that the back-side image is selected, then the control unit 90 performs the subsequent process which is one of the operations to store, transmit and copy the back-side image according to an input command set by the user (operation 221).

Although any one of the operations to store, transmit and copy the image is performed in Operations 213, 217 and 221, the present general inventive concept is not limited to this and a plurality of operations may be sequentially or simultaneously performed according to the setting of the user.

In the above-described embodiment, when a document is loaded on the document load table, the document is transferred, the double-side images of the document are automatically read, and the subsequent process is performed. That is, a single read mode is employed.

In another embodiment, a desired read mode may be selected from a plurality of read modes including the existing read modes, in addition to the read mode of the above-described embodiment. Here, the existing read modes include a double-side read mode, a front-side read mode, and a back-side read mode. The read mode of the above-described embodiment is called a basic read mode.

Figure 5:
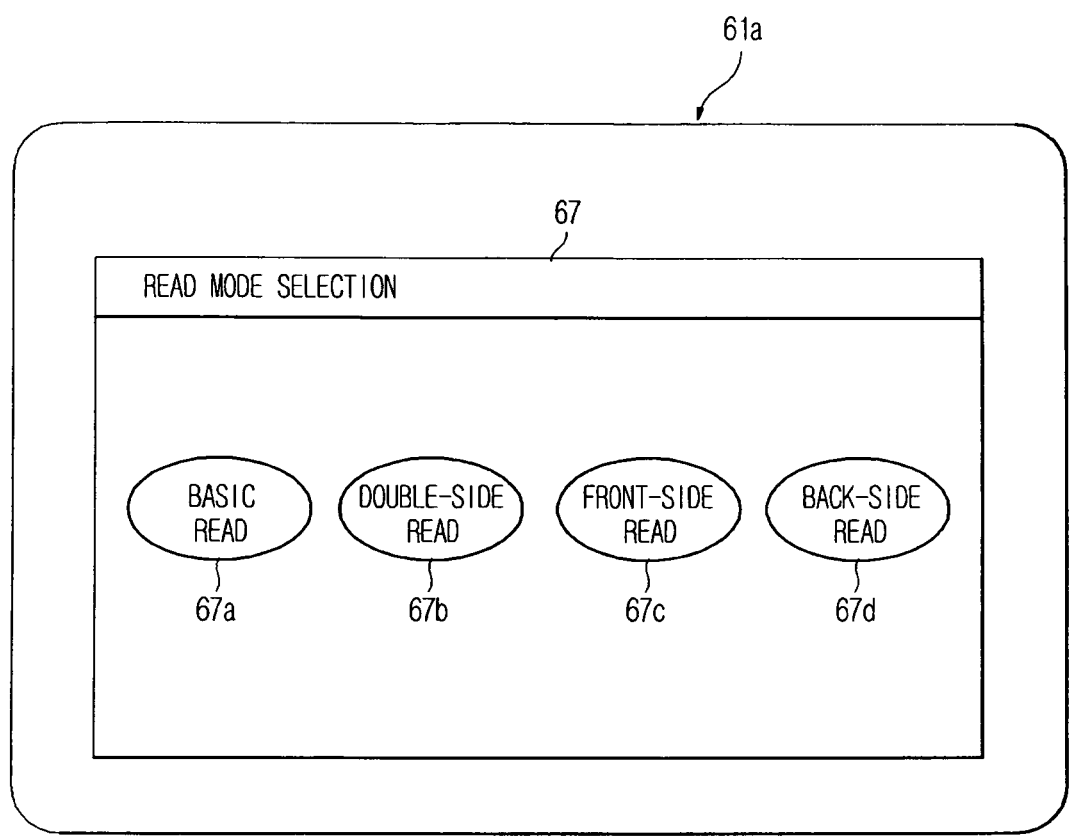
FIG. 5 is an example illustrating a screen to select a desired read mode from a plurality of read modes according to an embodiment of the present general inventive concept using the plurality of read modes.

In the present embodiment, as illustrated in FIG. 5, any one mode is selected from the plurality of read modes through a read mode selection region 67 of a screen 61a provided on the operation panel unit 60. The read mode selection region 67 includes a basic read key 67a, a double-side read key 67b, a front-side read key 67c and a back-side read key 67d.

Figure 6A:
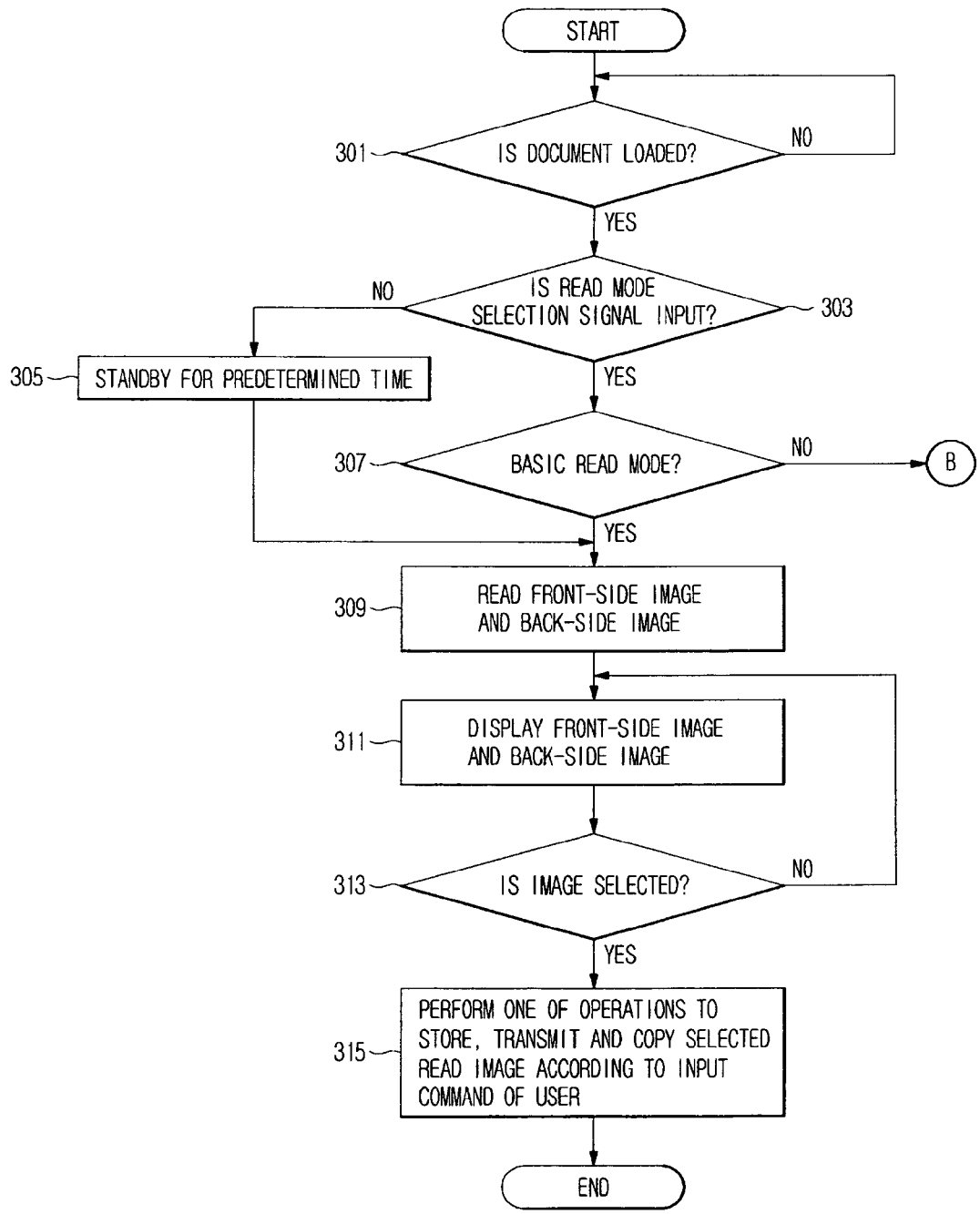
FIGS. 6A and 6B are flowcharts illustrating a method of processing images read according to the read modes by a process corresponding to an input command of the user, according to the embodiment as illustrated in FIG. 5 using the plurality of read modes.
Figure 6B:
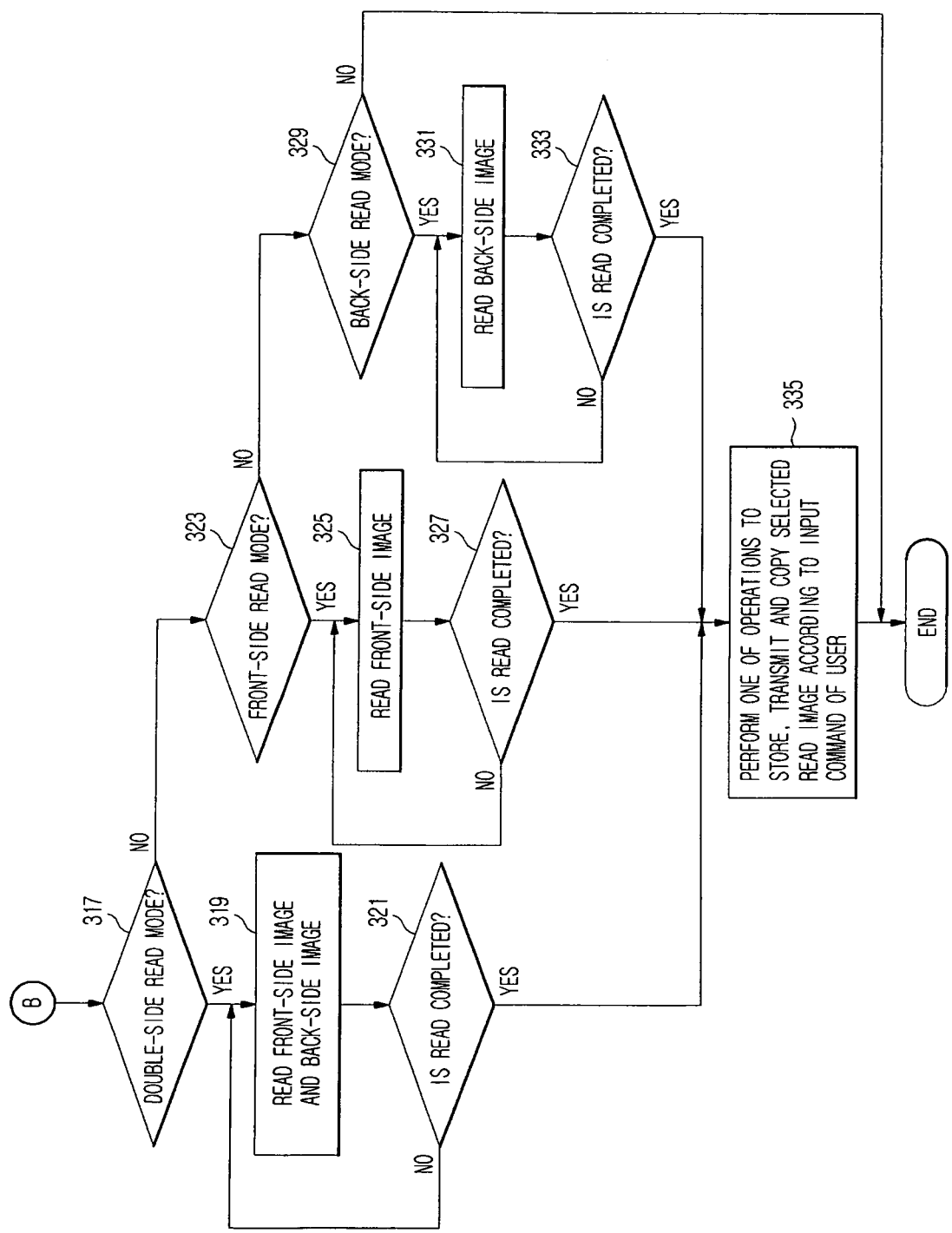

The method according to the present embodiment will be described with reference to FIGS. 6A and 6B.

The control unit 90 determines whether a document P is loaded on the document load table 10 using the document load detecting unit 11 (operation 301). If a determination is made that the document is loaded, then the control unit 90 displays the screen 61a to select the read mode through the operation panel unit 60 as illustrated in FIG. 5. The user may select a desired read mode from the basic read key 67a, the double-side read key 67b, the front-side read key 67c and the back-side read key 67d displayed in the read mode selection region 67 of the screen 61a. The control unit 90 determines whether a read mode selection signal corresponding to the selection of the read mode of the user is input (operation 303). If a determination is made that the selection signal is not input, the control unit 90 stands by for a predetermined time (operation 305) and the method then progresses to Operation 307 to read the image even when the selection signal is not input.

If a determination is made that the read mode selection signal is input in Operation 303, then a determination is made whether the basic read mode is selected by the basic read key 67a (operation 307). If the basic read mode is selected or the read mode is not selected and the predetermined time elapses, the control unit 90 controls the driving unit 130 such that the front-side image and the back-side image of the document are read by the first and second image sensors 31 and 32 while the document P is transferred along the transfer path 1 (operation 309) and the read front-side and back-side images are displayed as illustrated in FIG. 3 (operation 311).

Next, the control unit 90 determines whether the user selects a read image (operation 313). If a determination is made that the read image is selected, then the subsequent process which is any one of the operations to store, transmit and copy the selected read image is performed according to an input command of the user (operation 315).

If a determination is made that the basic read mode is not selected in Operation 307, then the control unit 90 determines whether the double-side read mode is selected by the double-side read key 67b (operation 317). If a determination is made that the double-side read mode is selected, then the control unit 90 transfers the document, reads the front-side image and the back-side image of the document using the first and second image sensors 31 and 32 (operation 319), and determines whether the double-side read process of the document loaded on the document load table is completed (operation 321). If a determination is made that the read process is not completed, then the method progresses to Operation 319 to perform the double-side read process. If a determination is made that the read process is completed, then the method progresses to Operation 335.

If a determination is made that the double-side read mode is not selected in Operation 317, then a determination is made as to whether the front-side read mode is selected by the front-side read key 67c (operation 323). If a determination is made that the front-side read mode is selected, then the control unit 90 transfers the document, reads the front-side image of the document using the first image sensor 31 (operation 325), and determines whether the front-side read process of the document loaded on the document load table is completed (operation 327). If a determination is made that the read process is not completed, then the method progresses to Operation 325 to perform the front-side read process. If a determination is made that the read process is completed, then the method progresses to Operation 335.

If a determination is made that the front-side read mode is not selected in Operation 323, then a determination is made as to whether the back-side read mode is selected by the back-side read key 67d (operation 329). If a determination is made that the back-side read mode is selected, the control unit 90 transfers the document, reads the back-side image of the document using the second image sensor 32 (operation 331), and determines whether the back-side read process of the document loaded on the document load table is completed (operation 333). If a determination is made that the read process is not completed, then the method progresses to Operation 331 to perform the back-side read process. If a determination is made that the read process is completed, then the method progresses to Operation 335.

If a determination is made that the read process is completed in Operations 321, 327 or 333, then the subsequent process which is any one of the operations to store, transmit and copy the read image is performed according to the input command of the user (operation 335).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the present general inventive concept, since double-side images of a document are read using image sensors mounted on a transfer path and are displayed on a screen so as to allow a user to select a desired image, and a subsequent process is performed, an operation to sort documents can be removed. Accordingly, a user convenience can be improved in view of an operation to read an image of a document and process a read image.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. An image forming apparatus, comprising:
   a document transfer path along which a document is transferred;
   an image reading unit mounted on the document transfer path to automatically read images from both sides of the document;
   a display unit to display the images from both sides of the document read by the image reading unit and image selection keys comprising a double-side key, a front-side key, and a back-side key, and to receive an input command of a user for selecting at least one image from the read images from both sides of the document of the image selection keys; and
   a control unit to control the display unit to display the read images from both sides of the document on the display unit when the both sides of the document are read by the image reading unit and the image selection keys to allow for the user to select at least one image from the read images from both sides of the document by selecting at least one of the image selection keys, and to control an image processing operation to be performed with respect to the read images from the both sides of the document in response to a selection by the user through the display unit of the double-side key, only the read front-side image in response to a selection by the user of the front-side key, and only the read back-side image in response to a selection by the user of the back-side key.

2. The image forming apparatus according to claim 1, wherein the image reading unit reads the images from both sides of the document using at least one image sensor mounted on the document transfer path.

3. The image forming apparatus according to claim 2, wherein, if the image reading unit includes a plurality of image sensors, the plurality of image sensors are provided to be separated from each other by a predetermined distance.

4. The image forming apparatus according to claim 1, wherein the display unit includes a touch screen to display a read image.

5. The image forming apparatus according to claim 4, wherein a display region to display a plurality of document images and the image selection keys to select an image to be processed from the plurality of document images are displayed on the touch screen.

6. The image forming apparatus according to claim 1, wherein the image processing operation of the control unit performs any one of operations to store, transmit and copy the selected read image.

7. A method of controlling an image forming apparatus including an image reading unit to read images on both sides of a document, the method comprising:
   loading the document on a document load table;
   automatically reading the images on both sides of the document transferred along a document transfer path using the image reading unit;
   displaying the read images from both sides of the document on the display unit when the both sides of the document are read by the image reading unit and image selection keys comprising a double-side key, a front-side key, and a back-side key for a user to select at least one image from the read images from both sides of the document of the image selection keys; and
   performing an image processing operation with respect to the read images from the both sides of the document in response to a selection by the user through the display unit of the double-side key, only the read front-side image in response to a selection by the user of the front-side key, and only the read back-side image in response to a selection by the user of the back-side key.

8. The method according to claim 7, wherein the read document images are obtained by at least one image sensor mounted on the document transfer path.

9. A method of controlling an image forming apparatus including at least one image sensor mounted on a document transfer path, the method comprising:
   displaying a screen on a display unit when the document is loaded on the document load table, the screen including at least one key corresponding to a first read mode to automatically read images from both sides of a document using the image sensor and select an image to process between the read images and at least one key corresponding to a second read mode to select at least one side of the document to be read and read an image from the selected side of the document; and
   performing at least one of operations to store, transmit and copy the read image from the both sides of the document to process by the selected read mode as a subsequent process when the first read mode is selected by the at least one key corresponding to the first read mode,
   wherein the first read mode includes:
   transferring the document to the at least one image sensor;
   reading a front-side image and a back-side image of the document by the at least one image sensor;
   displaying the front-side image and the back-side image of the document and image selection keys comprising a double-side key, a front-side key, and a back-side key on the screen of the display unit to allow a user to select at least one of the image selection keys; and
   selecting the read front-side image and back-side image in response to the double-side key being selected, only the read front-side image in response to the front-side key being selected, and only the read back-side image in response to the back-side key being selected.

* * * * *